US011634179B2

(12) United States Patent
Sheldon et al.

(10) Patent No.: US 11,634,179 B2
(45) Date of Patent: Apr. 25, 2023

(54) MULTI-MATERIAL VEHICLE ROOF STIFFENER

(71) Applicant: HONDA MOTOR CO., LTD., Tokyo (JP)

(72) Inventors: Allen B. Sheldon, Columbus, OH (US); Benjamin Hoffman, Raymond, OH (US); Duane T. Detwiler, Powell, OH (US); Ryan M. Hahnlen, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 16/855,590

(22) Filed: Apr. 22, 2020

(65) Prior Publication Data

US 2020/0247474 A1 Aug. 6, 2020

Related U.S. Application Data

(62) Division of application No. 15/610,146, filed on May 31, 2017, now Pat. No. 10,661,838.

(51) Int. Cl.
*B62D 25/06* (2006.01)
*B62D 27/02* (2006.01)
(Continued)

(52) U.S. Cl.
CPC ............ *B62D 25/06* (2013.01); *B29C 70/023* (2013.01); *B29C 70/304* (2021.05); *B29C 70/54* (2013.01);
(Continued)

(58) Field of Classification Search
CPC .... B62D 25/06; B62D 27/026; B62D 29/001; B62D 29/008; B29L 2031/3002;
(Continued)

(56) References Cited

U.S. PATENT DOCUMENTS 1,475,765 A 10/1984 Vogt et al.
4,601,511 A 7/1986 Nakamura et al.
(Continued)

FOREIGN PATENT DOCUMENTS

CA 2002568 A1 5/1990
CN 201777106 U 3/2011
(Continued)

OTHER PUBLICATIONS https://www.merriam-webster.com/dictionary/interleave (Year: 2022).*
(Continued)

*Primary Examiner* — Hilary L Gutman
(74) *Attorney, Agent, or Firm* — ArentFox Schiff LLP

(57) ABSTRACT

A vehicle roof stiffener includes at least one fiber reinforced polymer (FRP) portion and at least one metal or metal alloy portion. The FRP portion includes at least one transition structure including a metal or a metal alloy. At least some of the fibers of the FRP portion are embedded in the transition structure. The metal or metal alloy portion is secured to the transition structure of the FRP portion. In an example vehicle roof stiffener, the metal portion extends parallel to a longitudinal axis of a vehicle, and the FRP portion extends transverse to the longitudinal axis. The example vehicle roof stiffener may include a front FRP portion, a rear FRP portion, and two metal side portions. The metal side portions and the FRP portions may be joined by welding the transition structures to the metal portions.

11 Claims, 11 Drawing Sheets

(51) Int. Cl.
　　　*B62D 29/00*　　　(2006.01)
　　　*B29C 70/02*　　　(2006.01)
　　　*B29C 70/54*　　　(2006.01)
　　　*B29C 70/30*　　　(2006.01)
　　　*B29L 31/30*　　　(2006.01)
　　　*B29K 105/08*　　(2006.01)
　　　*B29K 705/00*　　(2006.01)

(52) U.S. Cl.
　　　CPC ......... *B62D 27/026* (2013.01); *B62D 29/001* (2013.01); *B29K 2105/08* (2013.01); *B29K 2313/00* (2013.01); *B29K 2705/00* (2013.01); *B29L 2031/3002* (2013.01); *B29L 2031/3055* (2013.01); *B62D 29/008* (2013.01)

(58) Field of Classification Search
　　　CPC ........... B29L 2031/3055; B29C 70/023; B29C 70/54; B29K 2105/08; B29K 2313/00; B29K 2705/00
　　　USPC ........................................................ 296/210
　　　See application file for complete search history.

(56) References Cited

U.S. PATENT DOCUMENTS

| | | | |
|---|---|---|---|
| 6,367,872 B1 | 4/2002 | Bohm et al. | |
| 6,467,834 B1 | 10/2002 | Barz et al. | |
| 6,592,174 B1 | 7/2003 | Rollin et al. | |
| 6,942,915 B1 | 9/2005 | Kondo et al. | |
| 8,652,606 B2 | 2/2014 | Griess et al. | |
| 8,820,824 B1 | 9/2014 | Hinz et al. | |
| 8,993,084 B2 | 3/2015 | Griess et al. | |
| 9,085,327 B2 | 7/2015 | Morgans et al. | |
| 9,114,836 B1 | 8/2015 | Hinz et al. | |
| 9,522,512 B2 | 12/2016 | Georgeson et al. | |
| 10,065,694 B1* | 9/2018 | Rompage | B62D 25/06 |
| 2003/0098614 A1 | 5/2003 | Shields | |
| 2004/0046425 A1 | 3/2004 | Wieschermann et al. | |
| 2005/0003195 A1* | 1/2005 | Joseph | B29C 70/443 44/620 |
| 2006/0141260 A1 | 6/2006 | Haque et al. | |
| 2008/0036240 A1 | 2/2008 | Lusk et al. | |
| 2009/0117366 A1 | 5/2009 | Honma | |
| 2010/0231007 A1 | 9/2010 | Freeman et al. | |
| 2011/0080020 A1 | 4/2011 | Ilzhoefer et al. | |
| 2012/0126581 A1 | 5/2012 | Rocheblave et al. | |
| 2013/0206496 A1 | 8/2013 | Hashimoto | |
| 2014/0021747 A1 | 1/2014 | Goettker et al. | |
| 2014/0030478 A1 | 1/2014 | Wittenberg | |
| 2014/0210233 A1 | 7/2014 | Brymerski et al. | |
| 2014/0300142 A1 | 10/2014 | Gneiting et al. | |
| 2015/0307044 A1 | 10/2015 | Hundley et al. | |
| 2016/0016614 A1 | 1/2016 | Conze | |
| 2016/0121936 A1 | 5/2016 | Patberg et al. | |
| 2016/0194030 A1 | 7/2016 | Patberg et al. | |
| 2018/0215420 A1 | 8/2018 | Hashimura et al. | |
| 2018/0244321 A1 | 8/2018 | McCloud | |
| 2019/0047480 A1 | 2/2019 | Espig | |
| 2019/0084621 A1 | 3/2019 | Swayne et al. | |
| 2019/0168891 A1 | 6/2019 | Linde et al. | |
| 2022/0169820 A1* | 6/2022 | Wang | B29C 70/44 |

FOREIGN PATENT DOCUMENTS

| | | |
|---|---|---|
| CN | 202294194 U | 7/2012 |
| CN | 102887172 A | 1/2013 |
| CN | 203032017 U | 7/2013 |
| CN | 104986196 A | 10/2015 |
| DE | 100 60 042 A1 | 6/2002 |
| DE | 102004016854 A1 | 10/2005 |
| DE | 10 2012 010 424 A1 | 11/2013 |
| DE | 10 2015 119 437 A1 | 5/2017 |
| EP | 0 694 726 A1 | 1/1996 |
| GB | 2484107 A | 4/2012 |
| JP | 2000-336777 A | 12/2000 |
| KR | 2018-056454 A | 5/2018 |
| WO | WO 2017/033626 A1 | 3/2017 |

OTHER PUBLICATIONS

Machine translation of DE 102012010424A1 (Year: 2013).*
Machine translation of DE 102015119437A1 (Year: 2017).*
Communication dated Dec. 22, 2020, issued by the German Patent Office in related German Application No. 10 2018 204 280.2.
Communication dated Nov. 15, 2021, from the State Intellectual Property Office of People's Republic of China in related Application No. 201810297092.2.
Hahnlen, et al., "Active Metal-matrix Composites with Embedded Smart Materials by Ultrasonic Additive Manufacturing," SPIE Proceedings vol. 7645, Industrial and Commercial Applications of Smart Structures Technologies, 2010.
Hahnlen, et al., "Aluminum-Matrix Composites with Embedded Ni-Ti Wires by Ultrasonic Consolidation," SPIE Proceedings vol. 7290, Industrial and Commercial Applications of Smart Structures Technologies, 2009.
Hahnlen, et al., "Performance and Modeling of Active Metal-Matrix Composites Manufactured by Ultrasonic Additive Manufacturing," SPIE Proceedings vol. 7979, Industrial and Commercial Applications of Smart Structures Technologies, 2011.

* cited by examiner

MULTI-MATERIAL VEHICLE ROOF STIFFENER

CROSS-REFERENCE TO RELATED APPLICATION

This application is a divisional of U.S. application Ser. No. 15/610,146 filed on May 31, 2017, the content of which is hereby incorporated by reference in its entirety.

BACKGROUND

Traditional vehicle roofs include a metal stiffener component. The metal stiffener component provides structural support to a relatively thin roof panel and helps the vehicle maintain its shape. The metal stiffener component, however, adds significant weight to the vehicle above a center of gravity of the vehicle. Therefore, the heavy weight of the metal stiffener component decreases the amount of lightweighting that can occur below the roof without raising the center of gravity of the vehicle.

In view of the foregoing, there is a need for improved vehicle roof stiffeners. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a vehicle roof stiffener. The vehicle roof stiffener may include a fiber reinforced polymer (FRP) portion including at least one transition structure comprising a metal or a metal alloy. At least some of the fibers of the FRP portion are embedded in the transition structure. The vehicle roof stiffener may include at least one metal or metal alloy portion secured to the transition structure of the FRP portion.

In another aspect, the disclosure provides a method of manufacturing a vehicle roof. The method may include providing at least one FRP portion of a roof stiffener including a plurality of metal tabs having fiber tows embedded therein. The method may include joining the plurality of metal tabs of the FRP portion to at least one metal portion to form the roof stiffener having a central opening.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle roof structure disclosed herein are merely terms of art that may vary from one manufacturer to another and should not be deemed to limit the present disclosure.

Generally described, the present disclosure provides for a vehicle roof stiffener including at least one metallic portion joined to at least one fiber reinforced polymer (FRP) portion. The at least one metallic portion and the at least one FRP portion may be joined by a metal or metal alloy transition structure including fiber embedded therein. The transition structure may be in the shape of an insert or tab. Although the transition structure is described herein as being a tab, the transition structure is not limited to any shape or geometry. The fiber may extend from the metallic tab. The FRP portion may include multiple layers of FRP with the fiber of the transition structure interleaved with the layers of FRP. Accordingly, the transition structure may form a permanent integrated feature of the FRP portion. The transition structure, because it is metal, may be welded to the metallic portion, e.g., via resistance spot welding. Accordingly, a strong permanent attachment between the metallic portion and the FRP portion may provide structural rigidity to the roof stiffener. In an aspect, the FRP portion may include carbon fibers. Other fibers that could be used include glass fibers, aramid fibers, polyparaphenylene-benzobisethiazole (PBO) fibers, ceramic fibers such as SiC, and any combinations thereof.

Figure 16:
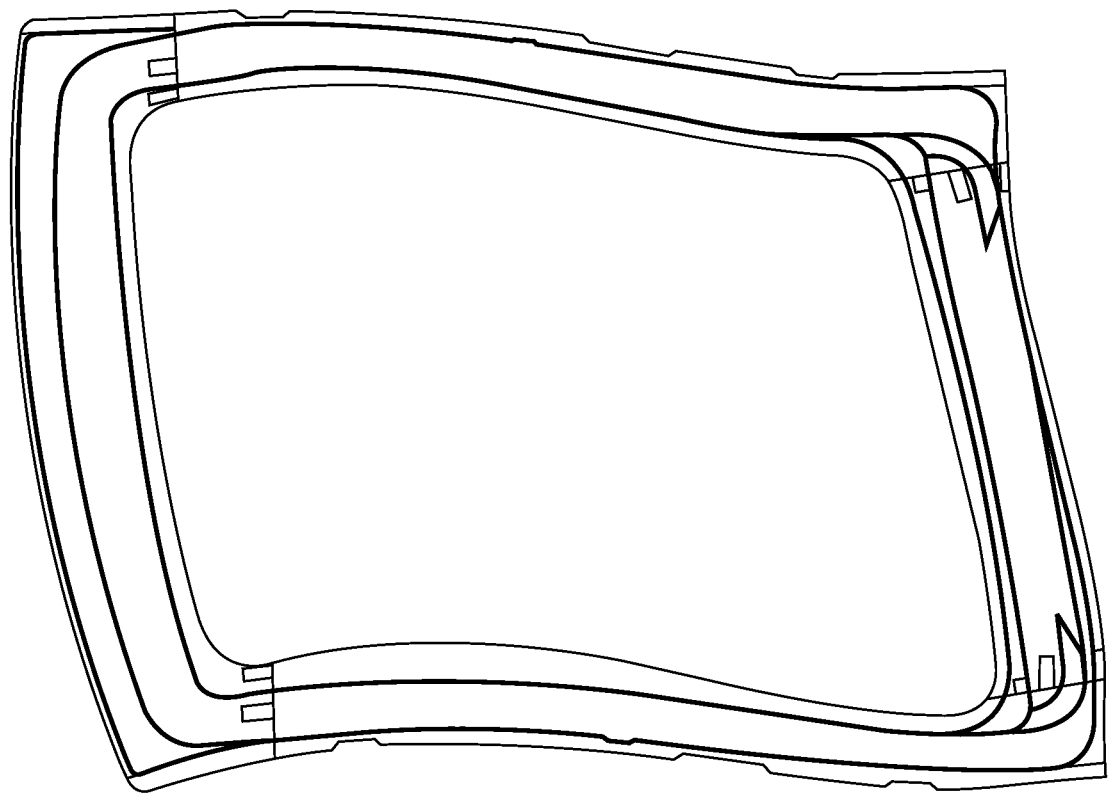
FIG. 16 is top view of a roof stiffener subject to a racking motion.

The use of a FRP portion where traditional roof stiffeners use metal may reduce the weight of the roof stiffener. The use of integrated transition structures including fiber embedded within a metallic tab may allow use of metal to metal joining techniques that do not damage the FRP portion. Accordingly, the structural properties of the FRP portion may be greater than that of a solid metal roof stiffener. Additionally, the FRP portion may be more resistant to a racking motion (e.g., collapsing and opening at opposing corners) than metal roof stiffeners, contributing to an increase in body rigidity. An example of a roof stiffener 700 experiencing a racking motion is illustrated in FIG. 16.

Figure 1:
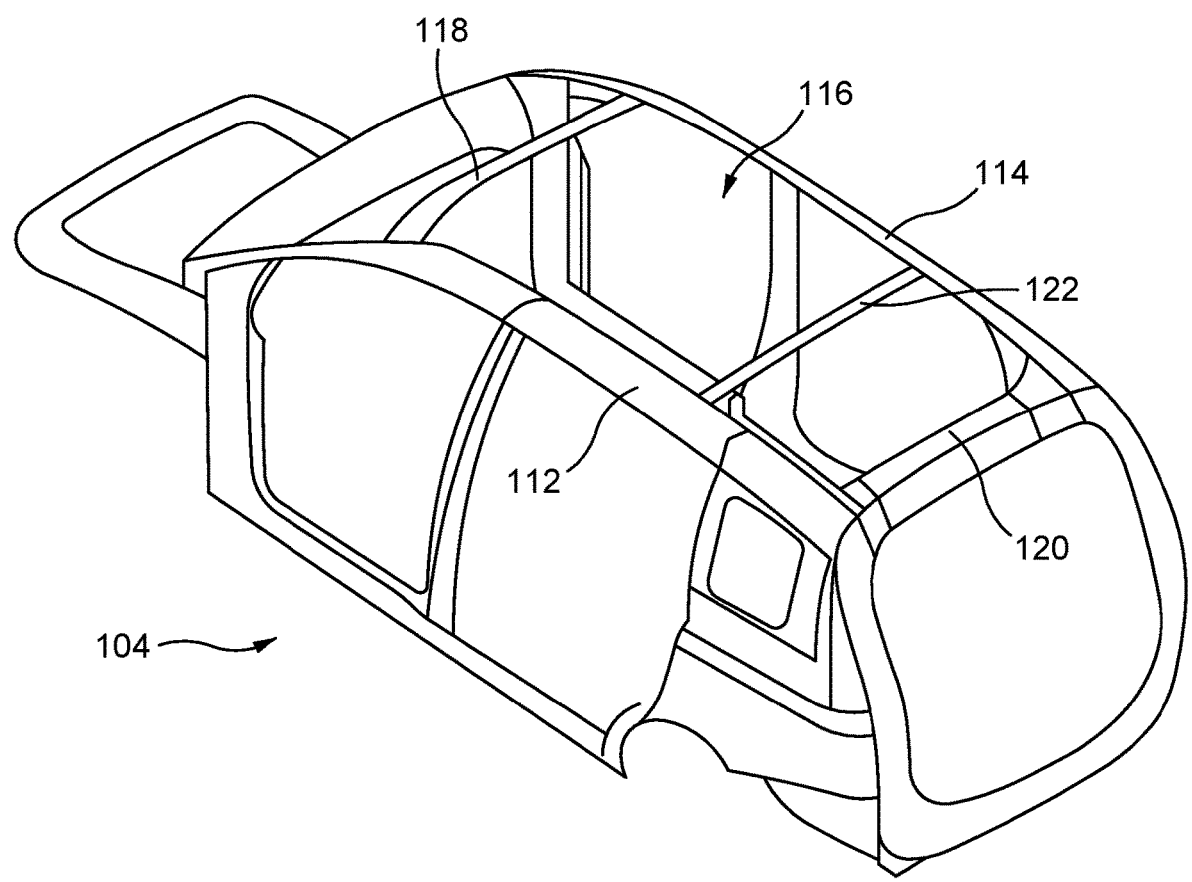
FIG. 1 is a perspective view of a vehicle body.

Turning to the figures, where like reference numbers refer to like components, FIG. 1 illustrates an example vehicle body 104, which may support a metal alloy vehicle roof structure (not shown) attached to the metal alloy vehicle body 104. As schematically shown in FIG. 1, the vehicle body 104 includes a pair of laterally spaced body members 112, 114 for defining sides of a passenger compartment 116 and a front roof rail 118 and a rear roof rail 120 spanning between the body members. A cross member or roof bow 122 interposed between the front and rear roof rails 118, 120 extends between the spaced body members 112, 114. The body members together with the front and rear roof rails 118, 120 support the vehicle roof structure over the passenger compartment 116. The spaced body members 112, 114 partially define a door frame.

Figure 2:
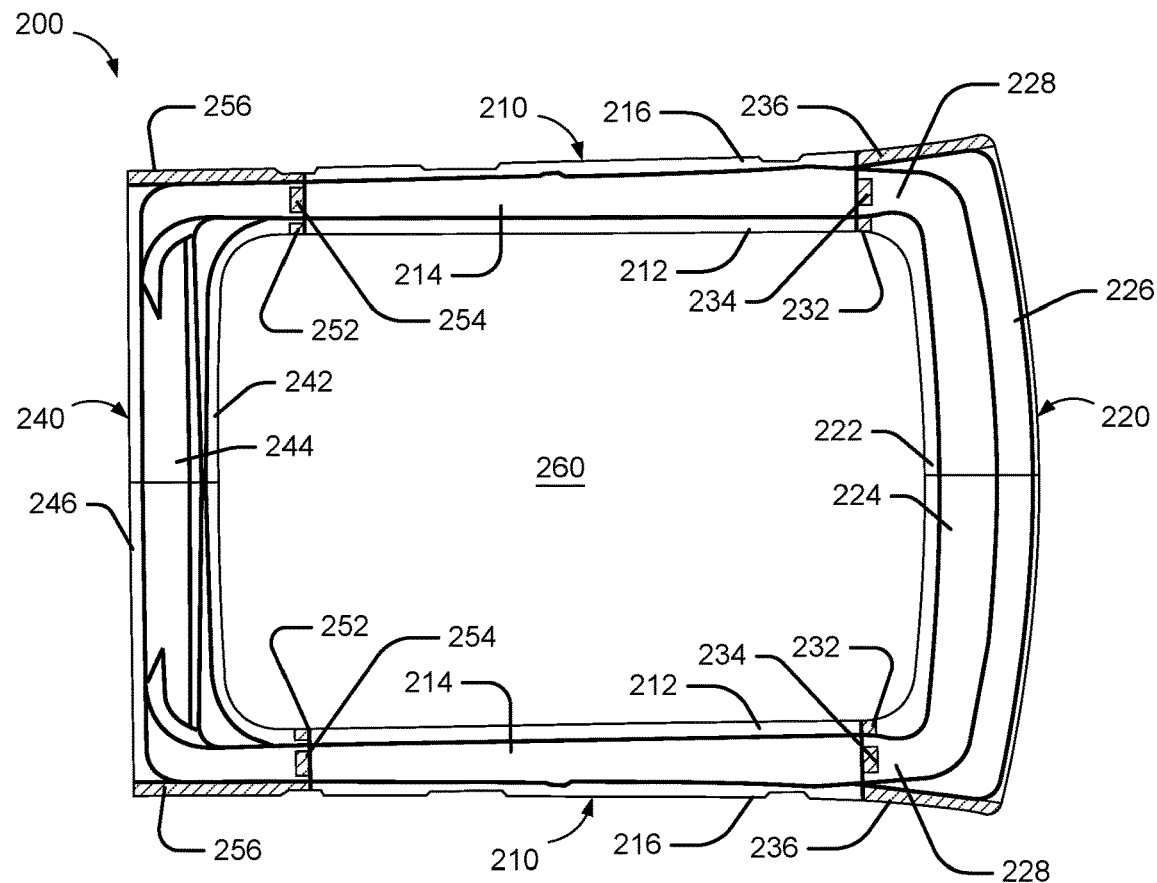
FIG. 2 is a top view of an example vehicle roof stiffener, according to an aspect of the disclosure.

FIG. 2 illustrates an example vehicle roof stiffener 200. The vehicle roof stiffener 200 may include metal side portions 210, a front FRP portion 220, and a rear FRP portion 240 joined together to define a central opening 260. The metal side portion 210 may form a side of the vehicle roof stiffener and extend substantially parallel to a longitudinal vehicle axis. That is, the metal side portion 210 may extend along a side of the vehicle from front to back. The front FRP portion 220 may extend transverse to the longitudinal vehicle axis at a front of the vehicle roof. The rear FRP portion 240 may extend transverse to the longitudinal vehicle axis as a rear of structural support for the roof.

Each metal side portion 210 may be a generally elongated frame member having a generally channel-like structure. For example, the metal side portion 210 may include an inner lip 212, a recessed central channel 214, and an outer lip 216. The channel-like structure of the metal side portions 210 may provide structural rigidity to help stiffen a roof assembly. The metal side portion 210 may be formed using conventional metal processes such as stamping a metal sheet. The metal side portion 210 may be formed of any metal or combination of metals compatible with the techniques disclosed herein. For example, the metal side portion 210 may be formed of steel, aluminum, magnesium, titanium, cobalt, beryllium, nickel, columbium, tantalum, tungsten, and alloys thereof, or other structural alloys.

The front FRP portion 220 may also be a generally elongate frame member having a generally channel-like structure. For example, the front FRP portion 220 may include an inner lip 222, a recessed central channel 224, and an outer lip 226. The channel-like structure of the front FRP portion 220 may provide structural rigidity to help stiffen a roof assembly. The front FRP portion 220 may include the two front corners of the roof stiffener 200. The front FRP portion 220 may extend across the entire front of the roof stiffener 200. The front FRP portion 220 may also include rearward projections 228 such that the ends of the front FRP portion 220 face longitudinally rearward and the edge of the rearward projections 228 is transverse to the longitudinal axis. Accordingly, the rearward projections 228 may mate with the forward facing ends of the metal side portions 210.

The front FRP portion 220 may include one or more transition structures having fiber tows embedded within a metal tab. For example, the front FRP portion 220 may include inner transition structures 232, middle transition structures 234, and outer transition structure 236 located on the rearward projections 228. The inner transition structures 232 may be located at ends of the inner lip 222. The middle transition structure 234 may be located at ends of the central channel 224. The outer transition structure 236 may be located at ends of the outer lip 226. In an aspect, the outer transition structure 236 may be an elongated transition structure that extends along an entire side of the front FRP portion 220. As discussed in further detail below, the transition structure 236 may be welded to a vehicle frame member.

Figure 17:
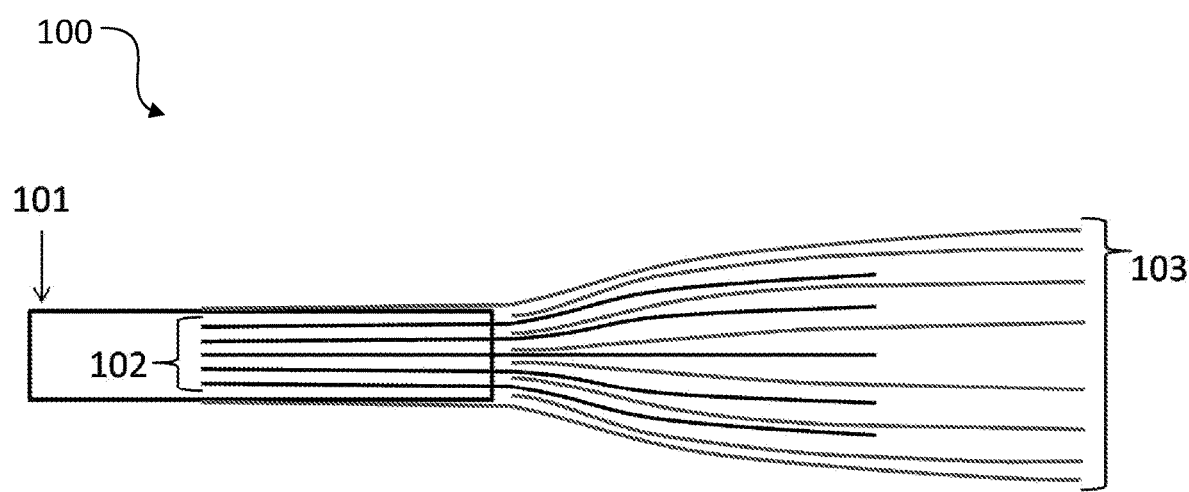
FIG. 17 is diagram of multiple layers of FRP with the fiber of the transition structure interleaved with the layers of FRP.

In an aspect, the transition structures described herein may include fiber tows embedded using ultrasonic additive manufacturing (UAM). UAM techniques for embedding fibers are described in, for example, Hahnlen and Dapino, "Active Metal-matrix Composites with Embedded Smart Materials by Ultrasonic Additive Manufacturing," Proceedings of SPIE—The International Society for Optical Engineering 7645:15, March 2010, which is incorporated herein by reference. The metal tab 101, as illustrated in FIG. 17, may be formed of any metal compatible with the techniques disclosed therein. For example, the metal tab 101 may be formed of steel, aluminum, magnesium, titanium, cobalt, beryllium, nickel, columbium, tantalum, tungsten, and alloys thereof, or other structural alloys. The fiber tows 102 may extend out from edges of the metal tab. The transition structure 100 may be embedded within the front FRP portion 220 during manufacture of the front FRP portion 220. For example, as illustrated in FIG. 17 the fiber tows 102 may be interleaved with fiber fabric 103 forming the front FRP portion 220, prior to consolidating the fiber fabric. Accordingly, the metal tabs 101 may form an integrated portion of the front FRP portion 220. The surface of the metal tabs 101 may be exposed. In some aspects, one or more edges of the metal tabs 101 may form an edge of the front FRP portion 220.

The rear FRP portion 240 may also be a generally elongate frame member having a generally channel-like structure similar to the front FRP portion 220. For example, the rear FRP portion 240 may include an inner lip 242, a recessed central channel 244, and an outer lip 246. The rear FRP portion 240 may also include one or more transition structures having fiber tows embedded within a metal tab. For example, the rear FRP portion 240 may include inner transition structures 252, middle transition structures 254, and outer transition structure 256. The inner transition structures 252 may be located at ends of the inner lip 242. The middle transition structure 254 may be located at ends of the central channel 244. The outer transition structure 256 may be located at ends of the outer lip 246. In an aspect, the outer transition structure 256 may be an elongated transition structure that extends along an entire side of the rear FRP portion 240. As discussed in further detail below, the transition structure 256 may be welded to a vehicle frame member. The transition structures 252, 254, 256 may have similar shapes and construction as the corresponding transition structures 232, 234, 236, respectively.

The transition structures 232, 234, 236, 252, 254, 256 may be joined (e.g., welded) to the metal side portions 210 to form the roof stiffener 200. For example, the roof stiffener may be generally trapezoidal or rectangular and define a central opening 260. The roof stiffener 200 may be mounted to a vehicle frame to provide support for a roof panel. The roof stiffener 200 may also support a glass assembly such as a panoramic roof, sun roof, or moon roof.

Figure 3:
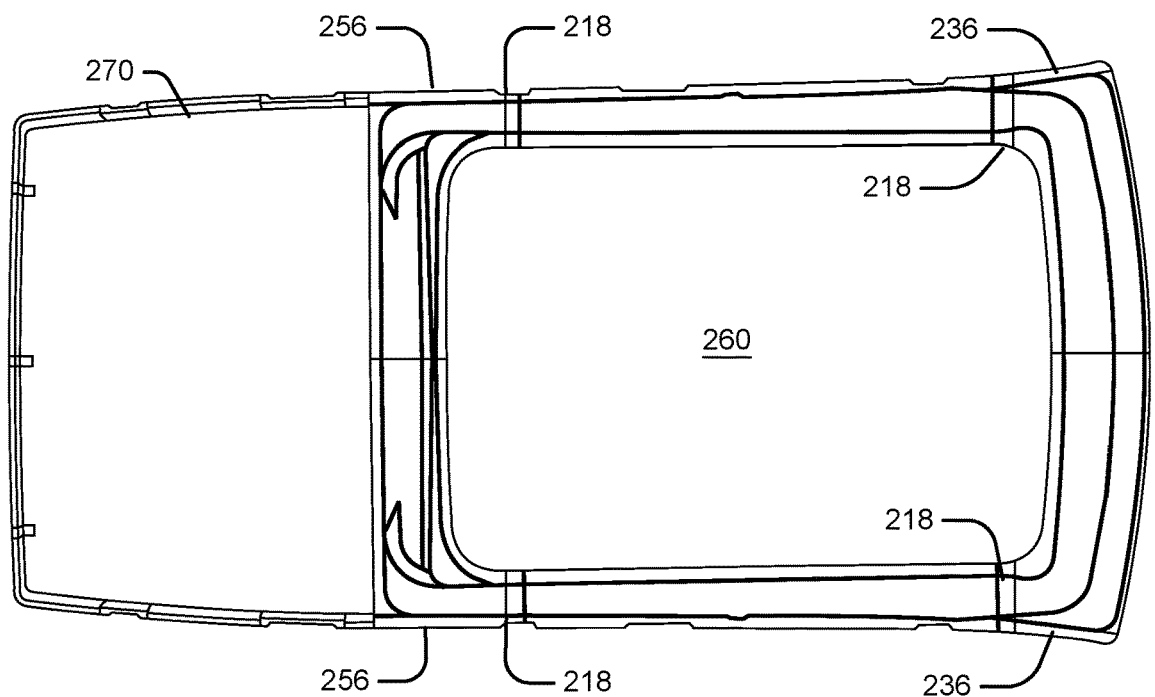
FIG. 3 is a bottom view of the example vehicle roof stiffener of FIG. 2 and a roof panel, according to an aspect of the disclosure.

Turning to FIG. 3, the example vehicle roof stiffener 200 may be attached to a roof panel 270. For example, the roof panel 270 may be joined to a top surface of the roof stiffener 200 (e.g., along inner lips 212, 222, 242, outer lips 216, 226, 246). The roof panel 270 may also extend from the roof stiffener 200 (e.g., rearward) without support. The extending portion of the roof panel 270 may be attached to a vehicle frame (e.g., by welding or other metal-to-metal joining techniques). In an aspect, the roof panel 270 may be aluminum or an alloy thereof and may be joined to the transition structures 236, 256 by welding.

Also visible in FIG. 3 are metal flanges 218 at the ends of metal side portions 210. The metal flanges 218 may be located where the metal side portions 210 overlap the front FRP portion 220 or the rear FRP portion 240. The metal flanges 218 may be offset from the remainder of the metal side portions 210 and receive the respective front FRP portion 220 or rear FRP portion 240. The transition structures (not visible) may be joined (e.g., welded) to the top surface of the metal flanges 218. It should be appreciated that the relative locations of the metal flanges 218 and the FRP portions may be reversed such that the metal flanges 218 are located on top and the FRP portions including the transition structures are located on the bottom. In an aspect where the elongated outer transition structures 236, 256 form the side edges of the respective FRP portions, part of the elongated outer transition structures 236, 256 extending from the respective metal flange 218 to the corners may form a bottom surface of the roof stiffener 200.

Figure 4:
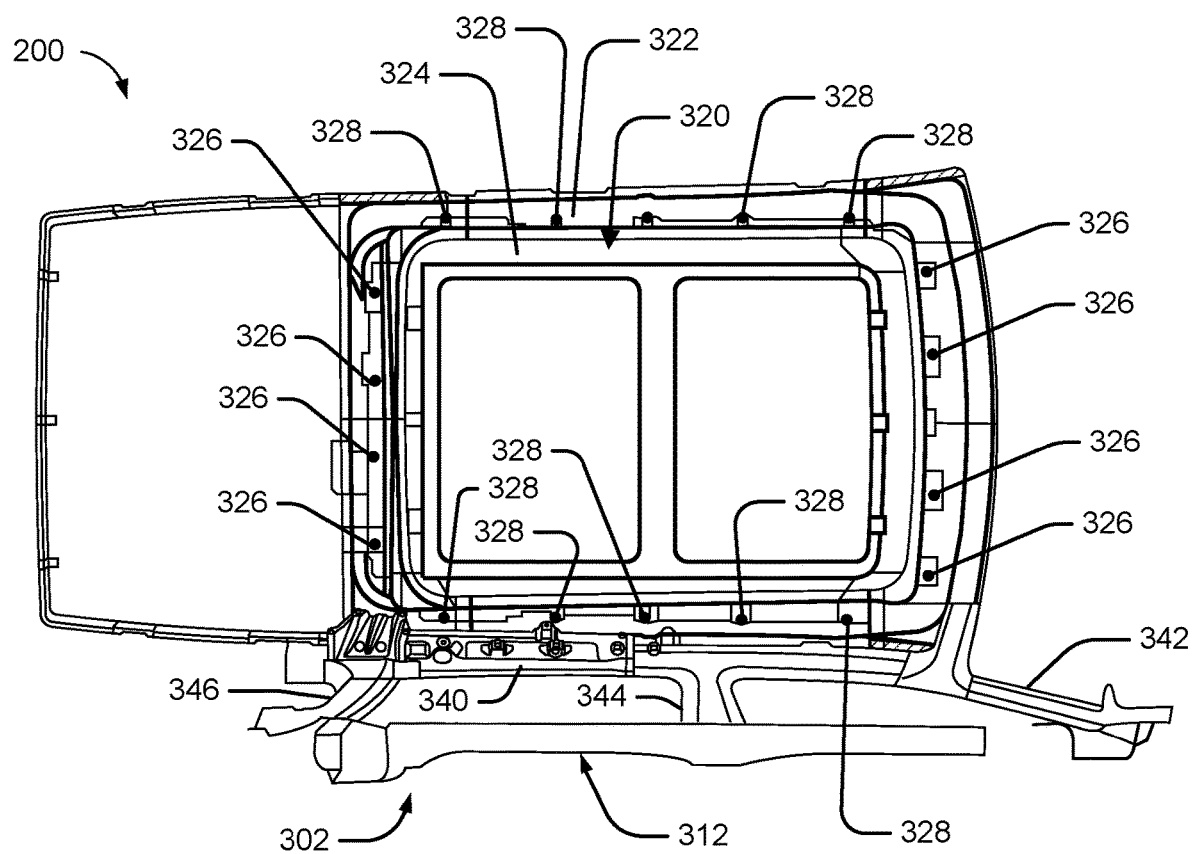
FIG. 4 is a bottom view of the example vehicle roof stiffener of FIG. 2 joined to a partial vehicle frame, according to an aspect of the disclosure.

FIG. 4 shows the example vehicle roof stiffener 200 joined to a partial vehicle frame 302, according to an aspect of the disclosure. The vehicle frame 302 may include a side body member 312, which may correspond to the body member 112 (FIG. 1). The side body member 312 may include a front pillar 342 (which may also be referred to interchangeably as an "A pillar"), a middle pillar 344 ("B pillar"), and a rear pillar 346 ("C pillar") that support a door frame 340. The roof stiffener 200 may be joined to the vehicle frame 302 at the door frame 340.

Joining different materials such as FRP and metal may present various issues. In particular, using fasteners that pierce the FRP such as bolts or rivets may reduce the structural integrity of the FRP. Designs may use thicker layers of FRP to accommodate such fasteners, but the thicker layers add weight and cost. The integration of the transition structures 336, 356 may allow the FRP portions of the roof stiffener to be attached to the vehicle frame using conventional metal to metal joining techniques such as but not limited to resistance spot welding, metal inert gas (MIG) welding, other welding, brazing, fasteners (e.g., screws, bolts, rivets), clinching, and hemming. In an aspect, the vehicle frame 302 may include steel, the metal side portions 210 may be aluminum, and the transition structures 236, 256 may include aluminum. The aluminum portions may be joined to the steel vehicle frame 302 using an adhesive and a fastener.

FIG. 4 also shows a glass assembly 320 mounted to the roof stiffener 200. The glass assembly 320 may be, for example, a panoramic glass assembly. The glass assembly 320 may be located in the central opening 260 of the roof stiffener 200. The glass assembly 320 may include one or more glass panes 322 supported by a frame 324. The frame 324 may allow one or more of the glass panes 322 to be retracted (e.g., to open a sun roof). The frame 324 may be attached to the roof stiffener 200 along a perimeter of the frame 324 and the inner lips 212, 222, 242 of the roof stiffener 200. The frame 324 may be mounted to the metal side portions 210 and the FRP portions 220, 240 using different techniques and/or fasteners. For example, the frame 324 may be mounted to the metal side portions 210 using fasteners 328 such as nuts and bolts, or rivets that extend through holes in both the frame 324 and the metal side portion 210. The FRP portions 220, 240 may include a T-stud 326 adhesively bonded to the surface of the FRP portions. The T-stud 326 may have a generally flat bonding surface and a threaded shaft extending normally to the bonding surface. The threaded shaft may be placed through holes in the frame 324 and secured with a nut. Because the glass assembly 320 is not a structural member of the vehicle, the adhesive bond may have sufficient strength. The use of the T-studs may eliminate the need to pierce the FRP portions.

Figure 5:
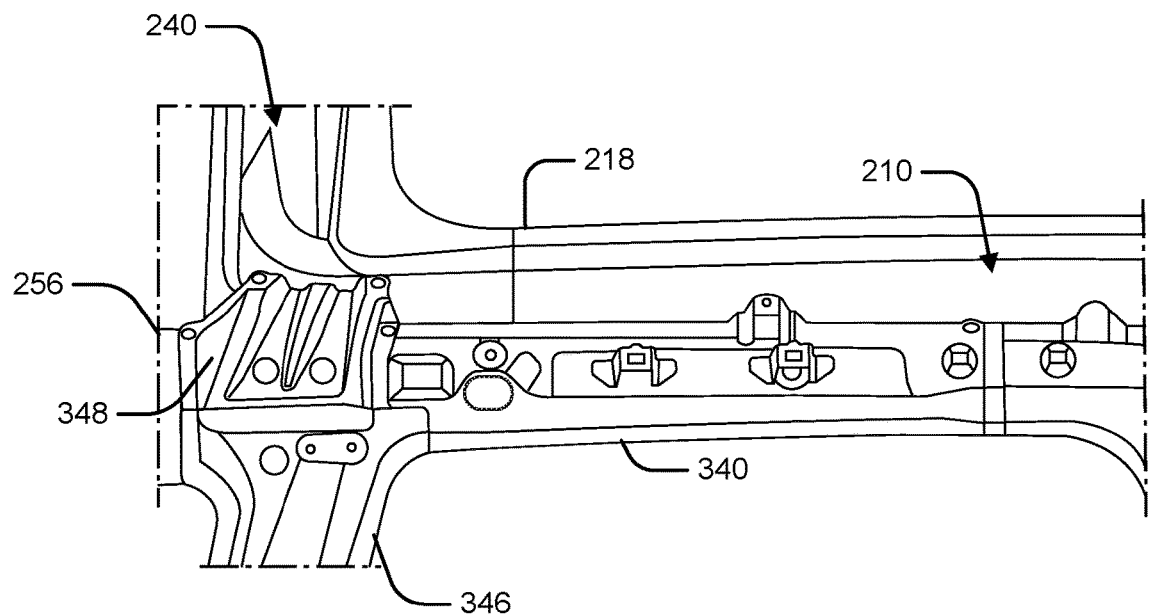
FIG. 5 is a perspective view of an interface between the example vehicle roof stiffener and the vehicle frame of FIG. 4, according to an aspect of the disclosure.

FIG. 5 is a perspective view of an interface between the example vehicle roof stiffener 200 and the vehicle frame 302. The door frame 340 may contact the metal side portion 210 along the outer lip 216 and be secured using metal to metal techniques (e.g., spot welds). Similarly, the door frame 340 may contact the elongated outer transition structures 236, 256 and be secured using metal to metal techniques (e.g., spot welds). In an aspect, a bracket 348 may also be used to secure the roof stiffener 200 to the door frame 340 or a pillar (e.g., rear pillar 346). As illustrated in FIG. 5, the bracket 348 may be mounted to the rear FRP portion 240. As discussed above, the FRP portion 240 may include additional layers in the region of the bracket 348 to provide sufficient structural integrity. In another aspect, one or more transition structures including embedded fiber may be located at the connection to the bracket 348. For example, the one or more transition structures may be integrated into the middle of the FRP portion 240. The bracket 348 may then be welded or fastened to the transition structure.

Figure 6:
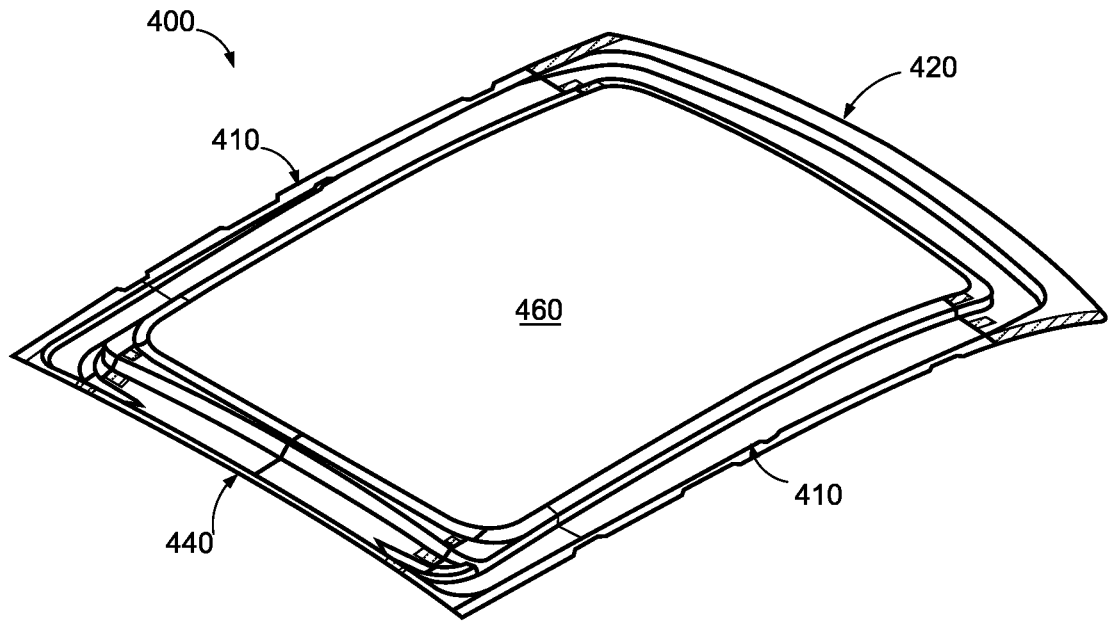
FIG. 6 is a perspective view of another example vehicle roof stiffener, according to an aspect of the disclosure.
Figure 7:
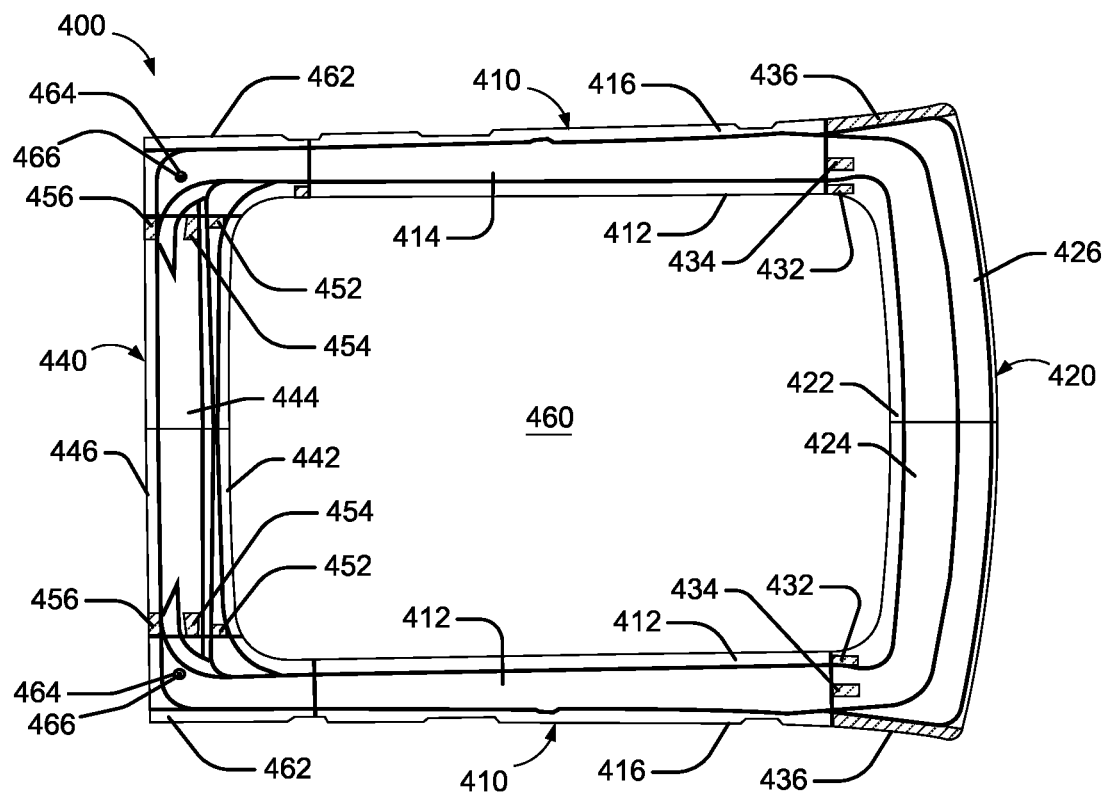
FIG. 7 is a top view of the example vehicle roof stiffener of FIG. 6.

FIG. 6 is a perspective view of another example vehicle roof stiffener 400, according to an aspect of the disclosure. FIG. 7 is a top view of the example vehicle roof stiffener 400. The roof stiffener 400 may include metal side portions 410, a front FRP portion 420, and a rear FRP portion 440, which may correspond to the metal side portions 210, front FRP portion 220, and rear FRP portion 240, respectively. The roof stiffener 400 may also define a central opening 460, where a glass assembly 320 may be mounted. The roof stiffener 400 may differ from the roof stiffener 200 in that the metal side portions 410 may extend to the rear corners of the roof stiffener 400. The joint between the metal side portions 410 and the rear FRP portion 440 may be located on a rear side of the roof stiffener 400. The rear FRP portion 440 may be generally straight and include inner transition structures 452, middle transition structures 454, and outer transition structures 456 located at opposite ends. In contrast to the outer transition structure 256, the outer transition structures 456 may be relatively shorter because the roof stiffener 400 may be joined to the vehicle frame along a rear flange 462 of the metal side portion 410. For example, the outer transition structure 456 may be approximately the same length as the middle transition structure 454. Additionally, the metal side portion 410 may include through holes 464 for attaching the roof stiffener 400 to the bracket 348 with fasteners 466. Accordingly, the roof stiffener 400 may avoid placing fasteners 466 through the rear FRP portion 440.

Figure 8:
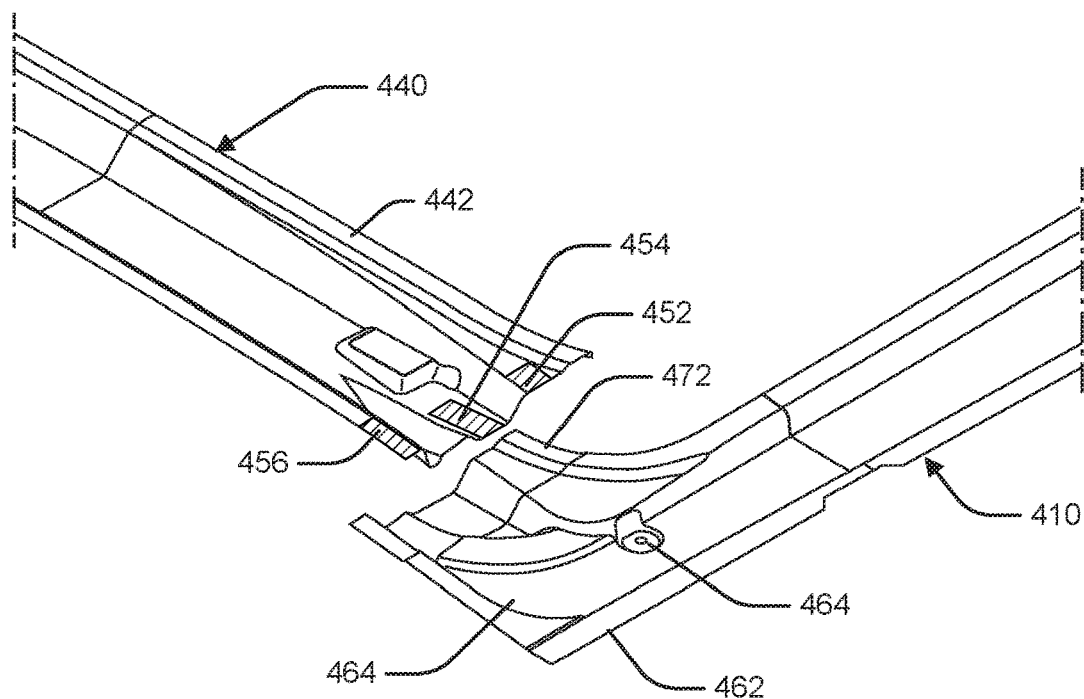
FIG. 8 is an exploded top perspective view of a rear corner of the example vehicle roof stiffener of FIG. 6, according to an aspect of the disclosure.
Figure 9:
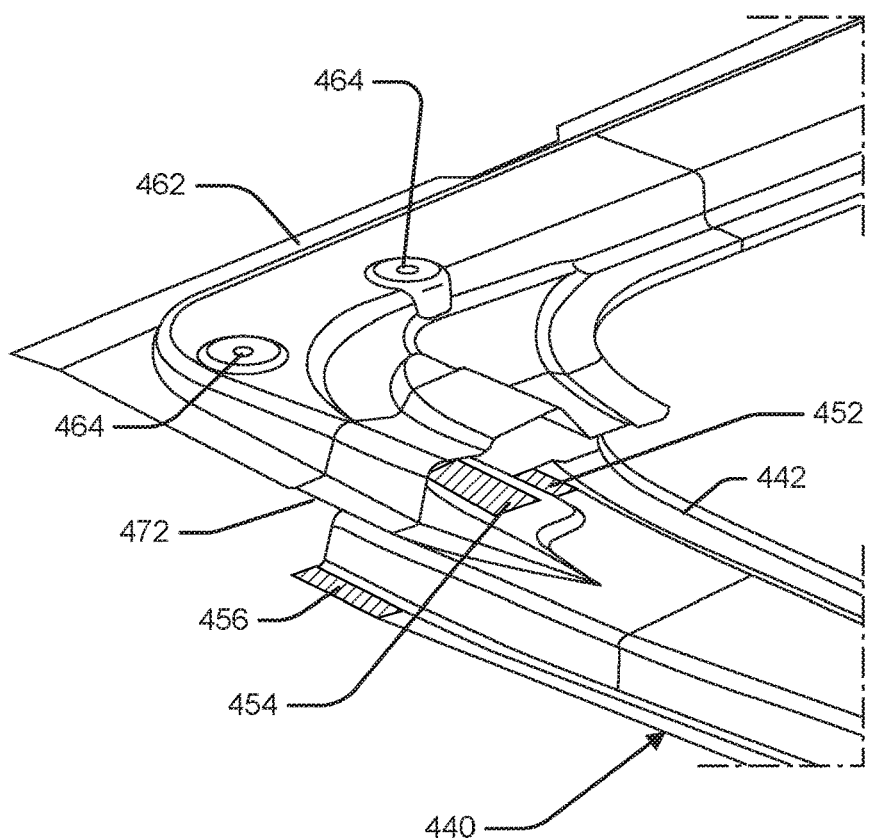
FIG. 9 is an exploded bottom perspective view of the rear corner of the example vehicle roof stiffener of FIG. 6, according to an aspect of the disclosure.

FIG. 8 is an exploded top perspective view of a rear corner of the example vehicle roof stiffener 400. FIG. 9 is an exploded bottom perspective view of the rear corner of the example vehicle roof stiffener 400. The metal side portion 410 may include a flange 472. The flange 472 may extend laterally inward from the metal side portion 410. The flange 472 may have a shape corresponding to a bottom surface of the end of the rear FRP portion 440 including the transition structures 452, 454, 456. The length of the flange 472 may be approximately the same as the length of one or more of the transition structures 452, 454, 456. The top surface of the flange 472 may be offset (e.g., lowered) by a distance approximately equal to the thickness of the rear FRP portion 440. Accordingly, when the rear FRP portion 440 is joined to the flange 472, a top surface of the rear FRP portion 440 may be level with a top surface of the metal side portion 410. As best seen in FIG. 9, the transition structures 452, 454, 456 are exposed on the underside of the FRP portion 440 and contact the flange 472.

Figure 10:
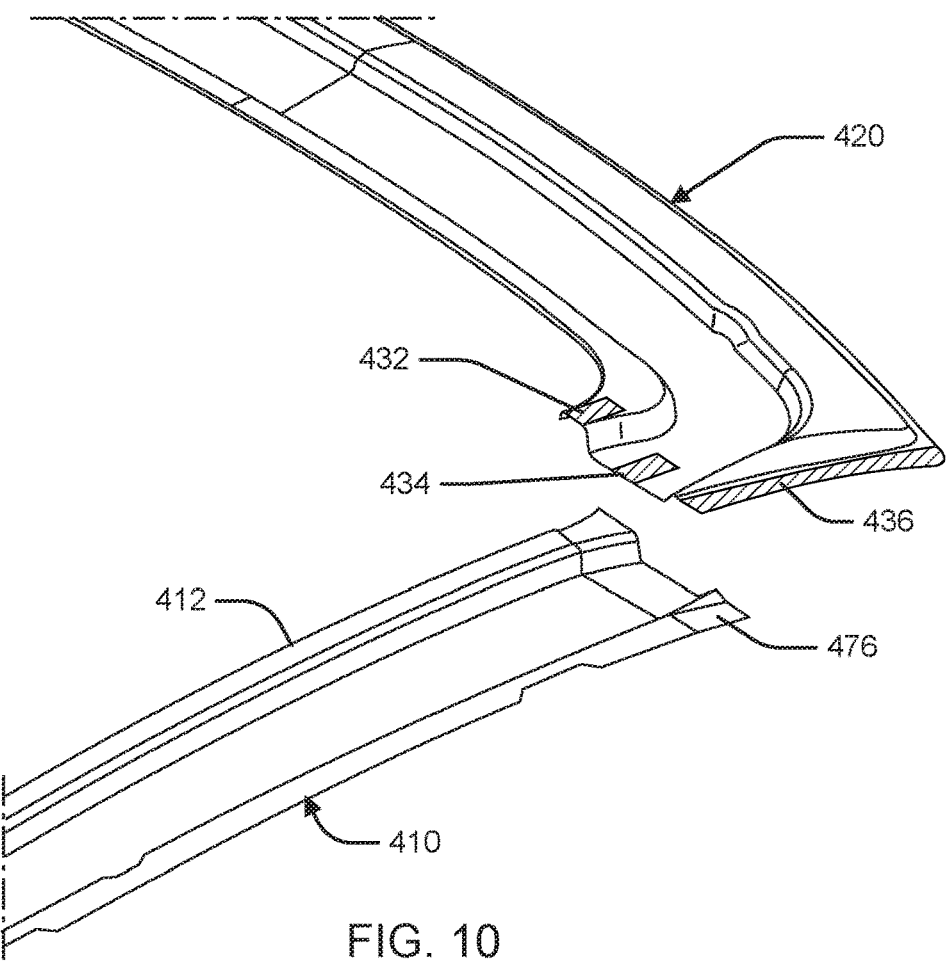
FIG. 10 is an exploded top perspective view of a front corner of the example vehicle roof stiffener of FIG. 6, according to an aspect of the disclosure.
Figure 11:
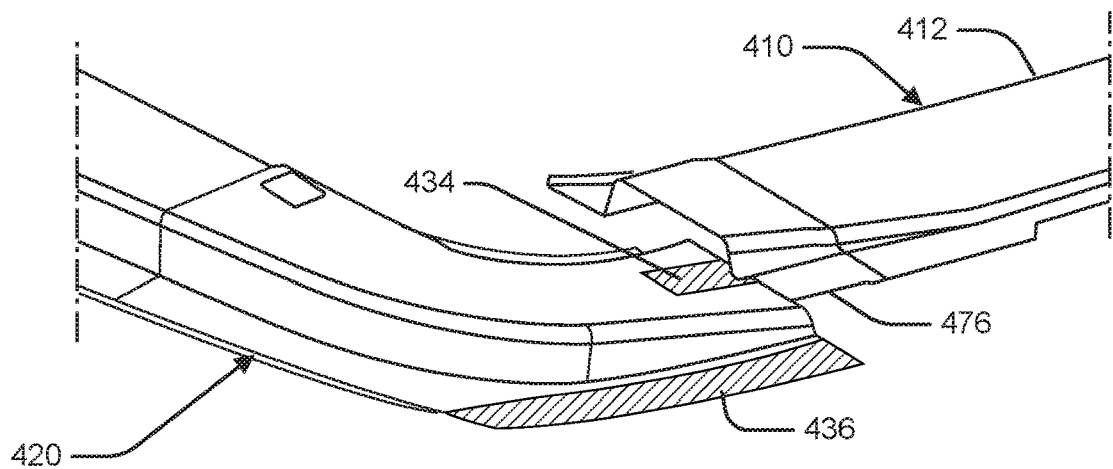
FIG. 11 is an exploded bottom perspective view of a front corner of the example roof stiffener of FIG. 6.

FIG. 10 is an exploded top perspective view of a front corner of the example vehicle roof stiffener 400. FIG. 11 is an exploded bottom perspective view of the front corner of the example vehicle roof stiffener 400. The front corner of the vehicle roof stiffener 200 may be similar to the front corner of the vehicle roof stiffener 400. The metal side portion 410 may include a flange 476 at the forward end. The flange 476 may have a shape corresponding to the end of the front FRP portion 420 including the transition structures 432, 434, 436. Similar to the flange 472, the flange 476 may be offset such that the end of the front FRP portion 420 may be received on the flange 476 and the top surfaces of the front FRP portion 420 and the metal side portion 410 may be level. The bottom surfaces of the transition structures 432, 434, 436 may contact and be secured to the flange 476. It should be noted that the outer transition structure 436 may be significantly longer than the flange 476 and extend to the front corner of the front FRP portion 430. That is, a first portion of the outer transition structure 436 may contact and be joined to the flange 476 and a second portion of the outer transition structure 436 may extend beyond the flange 476 and be joined to the vehicle frame (e.g., at door frame 340).

Figure 12:
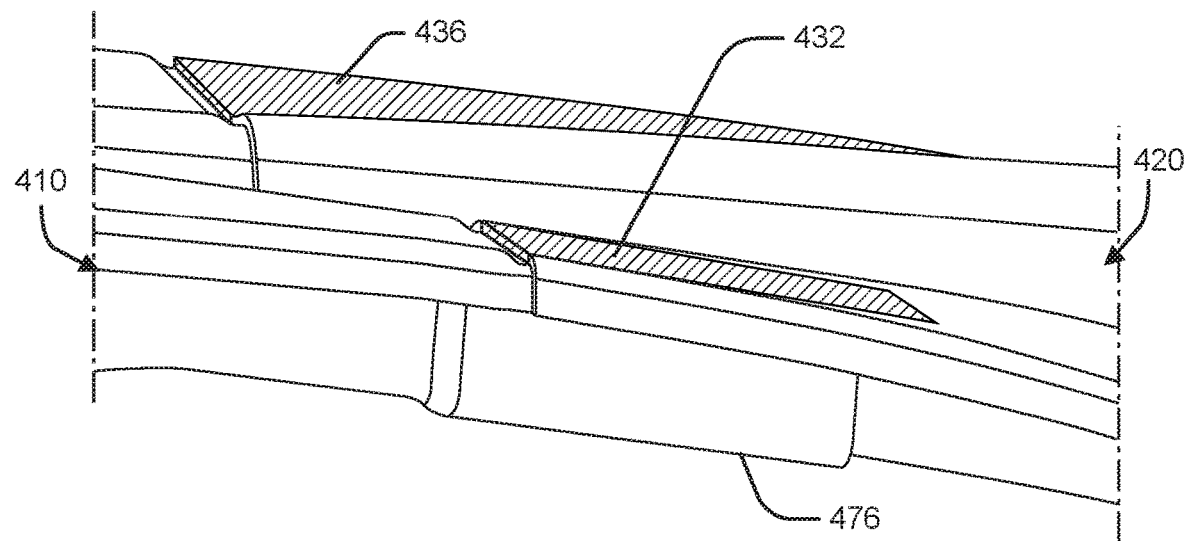
FIG. 12 is a side perspective view of an interface between an FRP component and a metal component, according to an aspect of the disclosure.

FIG. 12 is a side perspective view of an interface between the front FRP portion 420 and the metal side portion 410.

Figure 13:
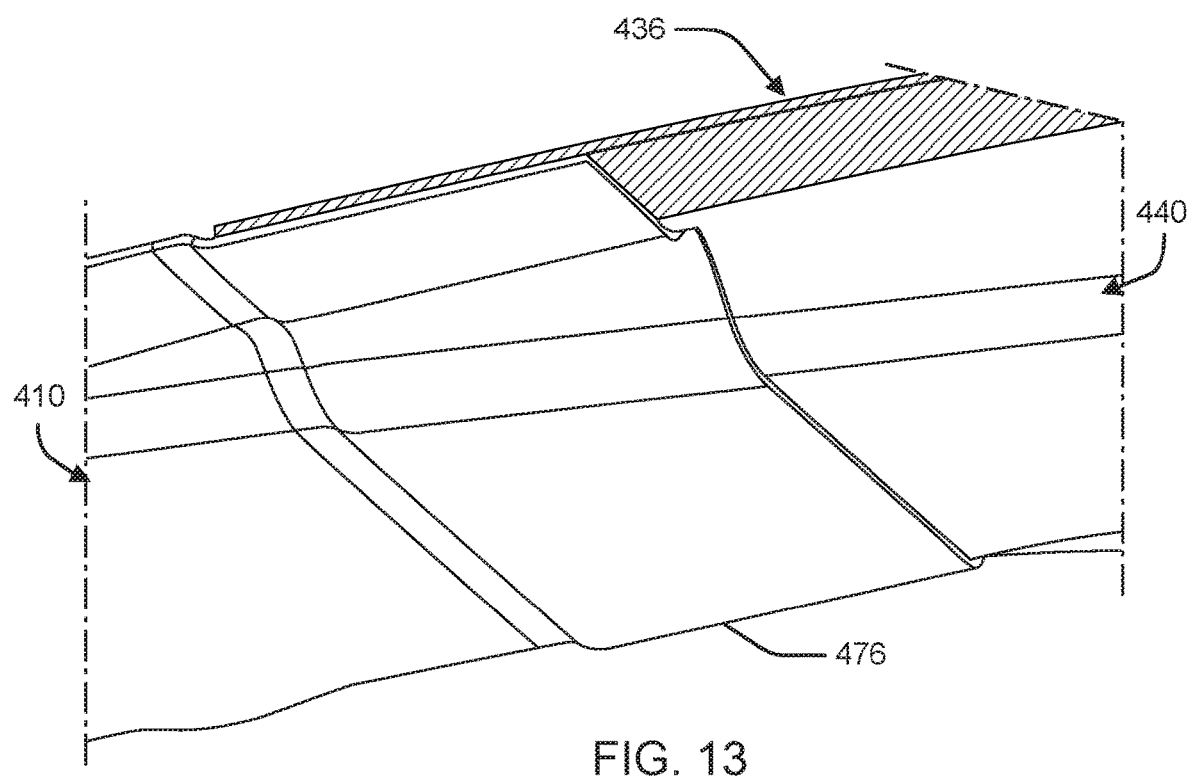
FIG. 13 is a bottom perspective view of the interface between an FRP component and a metal component of FIG. 12, according to an aspect of the disclosure.

FIG. 13 is a bottom perspective view of the interface between a FRP component and a metal component of FIG. 10. A similar interface may be present between the metal side portion 210 and the front FRP portion 220. As best seen in FIG. 10, the inner transition structure 432 may be integrated within the front FRP portion 420 such that a top surface of the inner transition structure 432 is level with the top surface of the front FRP portion 420. Similarly, the outer transition structure 436 may be integrated with the front FRP portion 420 to form a level top surface. Additionally, the offset of the flange 476 allows the front FRP portion 420 to seat on the flange 476 such that the top surfaces of the front FRP portion 420 and the metal side portion 410 are level. As best seen in FIG. 11, the outer transition structure 436 may be joined to the flange 476 at one end and extend beyond the flange 476. Accordingly, the bottom surface of the outer transition structure 436 may be exposed for joining to the vehicle frame. The front FRP portion 420 may be joined to the metal side portion 410 at the flange 476 by welding (e.g., using resistance spot welding) at each of the transition structure 432, 434, 436. Additionally, an adhesive or sealant may be placed between the front FRP portion 420 and the flange 476. Similar techniques may be used at each interface between the metal side portions 410 and the FRP portions in both the example roof stiffeners 200 and 400.

Figure 14:
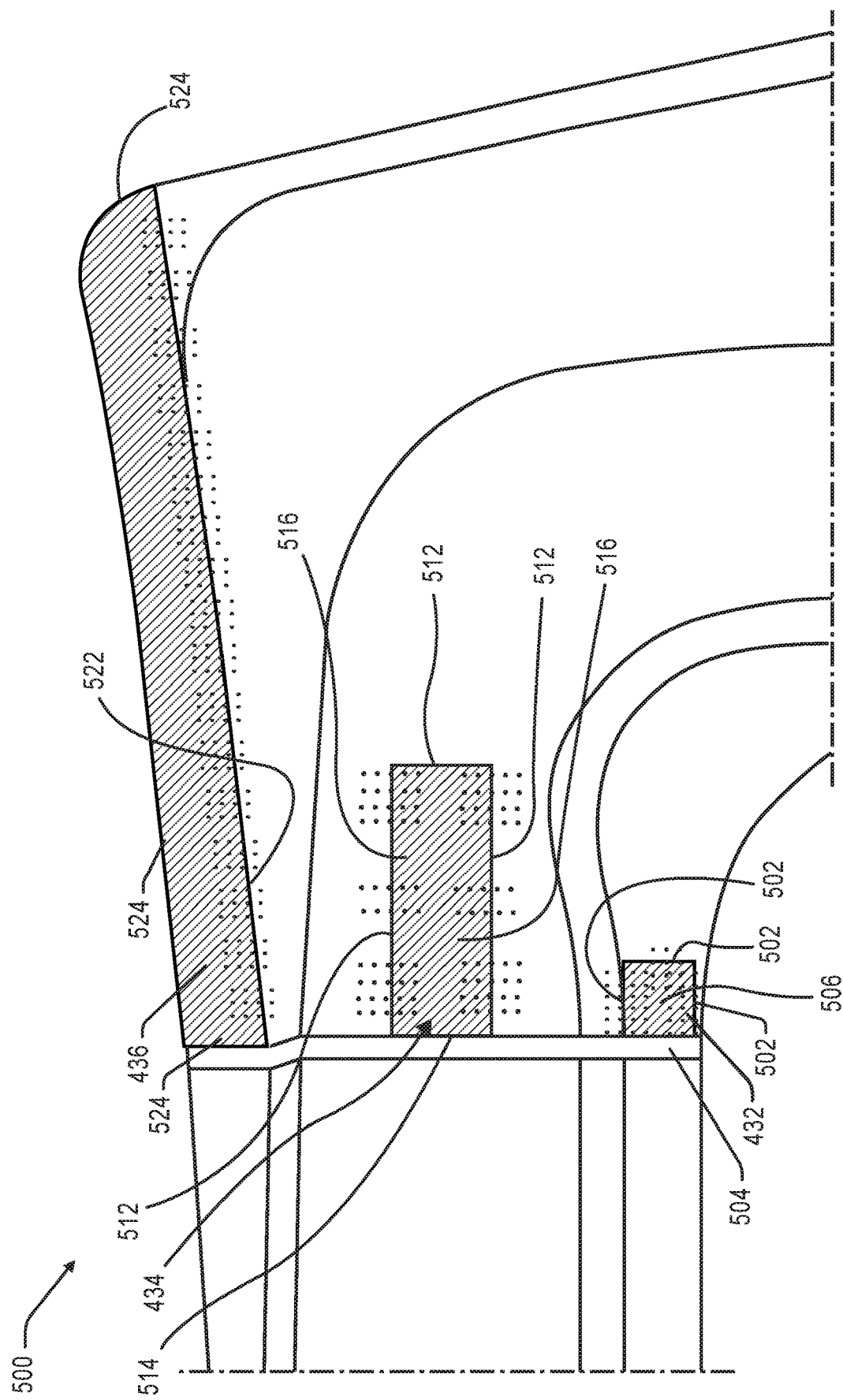
FIG. 14 is a top view of an interface region including transition components.

FIG. 14 illustrates further details of the transition structures located in an interface region 500 of the example roof stiffener 400. The transition structures may be designed for a planned joining technique. For example, where spot welding is used, the transition structures may be designed to accommodate one or more spot welding locations. For example, the inner transition structures 432 may have fibers extending from three sides 502. A fourth side 504 that forms an edge of the front FRP portion 420 may not include fibers. The fibers may extend inward from the three sides 502 such that a loop of fiber is embedded within both the metal tab and the FRP. In one aspect, the metal tab of inner transition structure 432 may be approximately 25 mm by 25 mm, which may accommodate a central spot weld in a central fiber free region 506. In another aspect, the length of the metal tab may be extended to allow two or more spot welds. Similarly, the middle transition structure 434 may include embedded fiber on three sides 512 and a free side 514 that forms the edge of the front FRP portion 220. The recessed central channel 424 may be larger than the inner lip 422, so an elongated metal tab may be oriented either longitudinally or transversely. In an aspect, an intended location 516 for a spot weld may be left free of fiber to prevent possible damage to the fiber. For example, a longitudinally oriented metal tab may have a length of at least 50 mm, preferably approximately 60 mm, and a width of approximately 25 mm. Starting from the edge, the metal tab may have fibers embedded in the first 12 mm, a first fiber free region 518 of approximately 5 mm, fibers embedded for another 25 mm, a second fiber free region 518 of approximately 5 mm, then fibers embedded along the sides and end of the metal tab. Accordingly, the example longitudinally oriented tab of the middle transition structure 234 may accommodate two locations 516 for spot welds. An example outer transition structure 236 may have fiber embedded along one of the long edges 522. The remaining sides 524 may form the corner of the front FRP portion 420 and may not have any embedded fibers. For example, the outer transition structure 436 may form the entire outer lip 426 along the longitudinal edges of the front FRP portion 220. The outer transition structure 436 may accommodate spaced apart spot welds along the entire length. It should be appreciated that although examples of tab shapes are provided, additional tab shapes may be designed based on the specific structure of the metal portion and FRP portion being joined. For example, fibers may be located in the transition structures of FIG. 2 to accommodate locations for spot welding.

Figure 15:
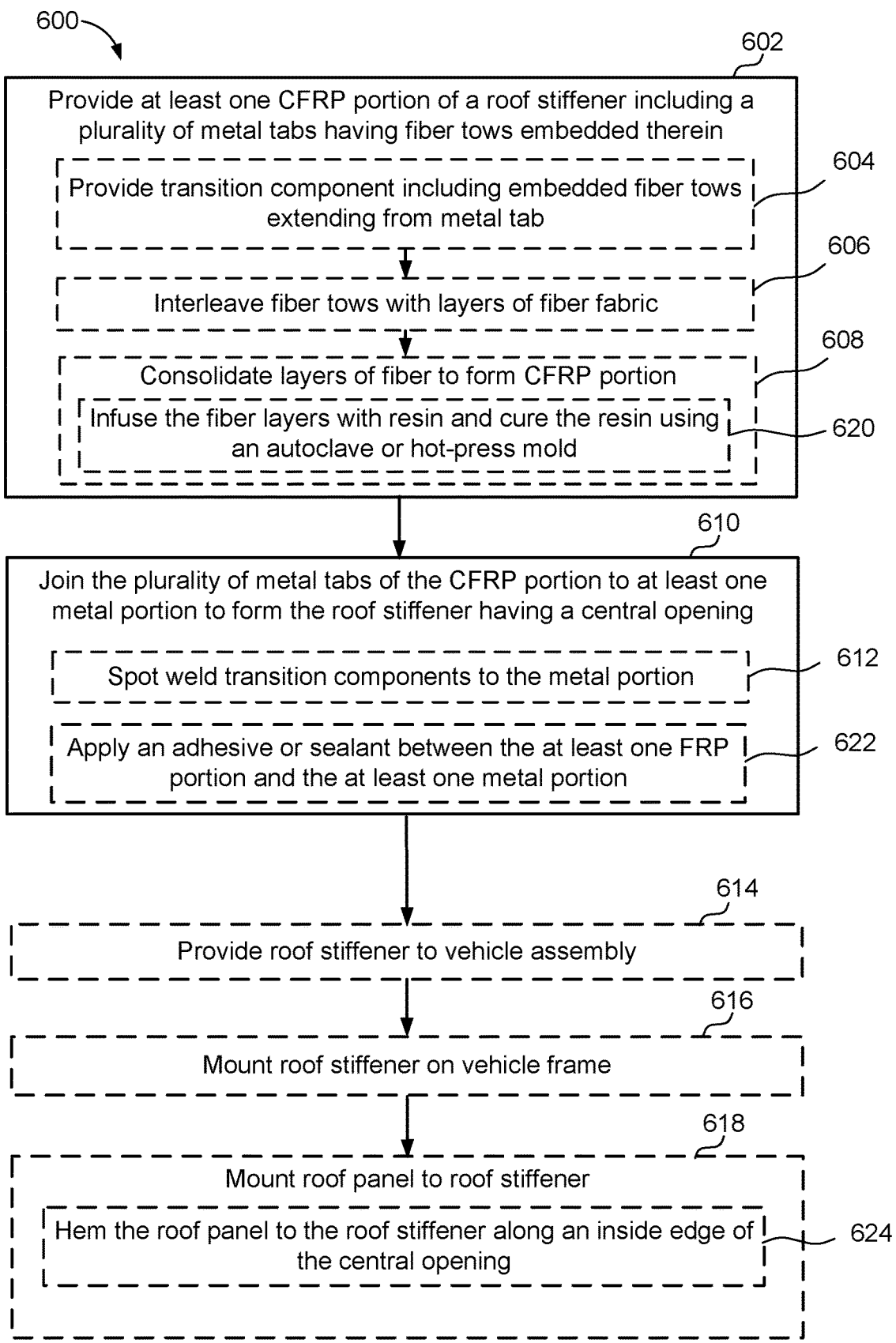
FIG. 15 is a flowchart illustrating an example method of manufacturing a vehicle roof, according to an aspect of the disclosure.

FIG. 15 is a flowchart illustrating an example method 600 of manufacturing a vehicle roof. The vehicle roof may include a roof stiffener 200, 400. The method 600 may be performed by an operator using equipment including an ultrasonic welding machine and other manufacturing tools and apparatuses known in the art. Although the method 600 is described below with respect to actions performed by an operator, one or more of the steps described herein may be automated (e.g., performed by a robotic arm).

In block 602, the method 600 may include providing at least on FRP portion of a roof stiffener including fiber embedded in a metal tab. In an aspect for example, one or more of the front FRP portions 220, 420 and/or the rear FRP portions 240, 440 may be provided. For example, one front FRP portion 220 and one rear FRP portion 240 may be provided to make the roof stiffener 200. Providing the at least one FRP portion may include manufacturing the at least one FRP portion as illustrated in blocks 604, 606, 608.

In block 604, block 602 may include providing a plurality of transition components comprising the plurality of metal tabs having the embedded fiber tows extending therefrom. As discussed above, the plurality of transition components may be manufactured using UAM to embed fiber tows within each metal tab. The fiber tows may extend from the sides of the metal tab that are to contact the FRP portion. The fiber tows may also be woven to form a fabric, or tows of a fabric may be embedded within the metal tab.

In block 606, block 602 may include interleaving the fibers tows with layers of fiber fabric. In an aspect, for example, the layers of fiber fabric may be carbon-fiber fabric cut to the shape of the FRP portion. The layers may include a cutout in the location of the transition structures. The metal tabs of the transition components may be placed in the cutouts with the fiber tows extending over a layer of carbon-fiber fabric. Another layer of carbon-fiber fabric may then be placed over the fiber tows. Multiple layers may be interleaved to integrate the transition component with the fiber layers.

In block 608, block 602 may include consolidating the layers of fiber fabric to form the FRP portion. In an aspect, for example, the consolidating may include any process for binding fiber layers used to manufacture FRP components. For example, at sub-block 620, consolidating may include infusing the fiber layers with resin and curing the resin using an autoclave or hot- press mold. The FRP component formed may be a FRP portion of the roof stiffener.

In block 610, the method 600 may include joining the FRP portion to the metal portion. For example, the front FRP portion 220, 420 and/or the rear FRP portion 240, 440 may be joined to one or more metal side portions 210, 410. In block 612, block 610 may include spot welding the transition components to the metal portion. For example, the front FRP portion 420 may be joined to the metal side portion 410 at the flange 476 by spot welding (e.g., using resistance spot welding) at each of the transition structures 432, 434, 436. Alternatively, other known metal to metal joining techniques (e.g., MIG welding, brazing, fasteners, clinching, and hemming, all with or without adhesives or sealers) may be used. Additionally, at sub-block 622, block 610 may include applying an adhesive or sealant between the front FRP portion 420 and the flange 476 and between the rear FRP portion 240 or 440 and flange 472.

In block 614, the method 600 may optionally include providing the roof stiffener to a vehicle assembly facility. In an aspect, for example, one or more of the roof stiffeners 200, 400 may be provided to a vehicle assembly facility. The roof stiffeners 200, 400 may be compatible with existing vehicle assembly lines. Accordingly, the roof stiffeners 200, 400 may be mounted to the vehicle using traditional tools.

In block 616, the method 600 may optionally include mounting the roof stiffener on a vehicle frame. In an aspect, for example, the roof stiffener 200, 400 may be mounted to the vehicle frame 302. In an implementation, the roof stiffener 200, 400 may be attached to the vehicle frame 302 using spot welds along the outer lips 216, 416, and/or rear flange 462 and the transition structures 236, 256, 436, 456. The roof stiffener 200, 400 may also be attached to one or more brackets 348 with fasteners.

In block 618, the method 600 may optionally include mounting a roof panel to the roof stiffener. In an aspect, for example, the roof panel may be welded to the roof stiffener 200, 400 at the transition structures. For example, spot welds may be placed along the metal side portion 210, and at the transition structures 236 and 256 between the stiffener, roof skin, and door frame/vehicle structure. Also, at sub-block 624, the roof skin may be hemmed to the roof stiffener 200 along the inside edge formed by the free edges of inner lips 212, 222, and 242.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of manufacturing a vehicle roof, comprising:
   providing at least one fiber reinforced polymer (FRP) portion of a roof stiffener including a plurality of metal tabs having fiber tows embedded therein, wherein providing the at least one FRP portion comprises:
      providing a plurality of transition components comprising the plurality of metal tabs having the embedded fiber tows extending therefrom;
      interleaving the embedded fiber tows with layers of fiber fabric; and
      consolidating the layers of fiber fabric and the embedded fiber tows after the interleaving to form the FRP portion; and
   joining the plurality of metal tabs of the FRP portion to at least one metal portion to form the roof stiffener having a central opening.

2. The method of claim 1, further comprising mounting the roof stiffener on a vehicle frame by joining at least one of the plurality of metal tabs to the vehicle frame.

3. The method of claim 2, wherein mounting the roof stiffener on the vehicle frame comprises spot welding the plurality of metal tabs and the at least one metal portion to the vehicle frame.

4. The method of claim 2, further comprising attaching the roof stiffener to one or more brackets with fasteners.

5. The method of claim 1, further comprising mounting a roof panel to the roof stiffener by joining at least one of the plurality of metal tabs to the roof panel.

6. The method of claim 5, wherein joining at least one of the plurality of metal tabs to the roof panel comprises spot welding the roof panel to the roof stiffener at the at least one metal portion and at each of the metal tabs.

7. The method of claim 5, wherein mounting the roof panel to the roof stiffener further comprises hemming the roof panel to the roof stiffener along an inside edge of the central opening.

8. The method of claim 1, wherein consolidating the layers of fiber fabric to form the FRP portion comprises infusing the fiber layers with resin and curing the resin using an autoclave or hot-press mold.

9. The method of claim 1, wherein joining the plurality of metal tabs of the FRP portion to the at least one metal portion comprises welding the plurality of metal tabs to the at least one metal portion.

10. The method of claim 9, wherein welding the plurality of metal tabs to the at least one metal portion comprises spot welding the transition components to the metal portion.

11. The method of claim 1, further comprising applying an adhesive or sealant between the at least one FRP portion and the at least one metal portion.

* * * * *